US010035569B1

(12) United States Patent
Cooper

(10) Patent No.: US 10,035,569 B1
(45) Date of Patent: Jul. 31, 2018

(54) RECREATIONAL WATERCRAFT AND METHOD OF ASSEMBLY

(71) Applicant: Bote, LLC, Fort Walton Beach, FL (US)

(72) Inventor: Corey Cooper, Destin, FL (US)

(73) Assignee: Bote, LLC, Fort Walton Beach, FL (US)

(*) Notice: Subject to any disclaimer, the term of this patent is extended or adjusted under 35 U.S.C. 154(b) by 0 days.

(21) Appl. No.: 15/491,082

(22) Filed: Apr. 19, 2017

Related U.S. Application Data

(60) Provisional application No. 62/452,782, filed on Jan. 31, 2017.

(51) Int. Cl.
| | | |
|---|---|---|
| *B63B 35/79* | (2006.01) | |
| *B63B 5/24* | (2006.01) | |
| *B32B 7/12* | (2006.01) | |
| *B32B 27/36* | (2006.01) | |
| *B32B 27/08* | (2006.01) | |
| *B29C 51/08* | (2006.01) | |
| *B29C 51/26* | (2006.01) | |
| *B29C 65/48* | (2006.01) | |

(Continued)

(52) U.S. Cl.
CPC .......... *B63B 35/7909* (2013.01); *B29C 51/08* (2013.01); *B29C 51/266* (2013.01); *B29C 63/04* (2013.01); *B29C 65/48* (2013.01); *B32B 7/12* (2013.01); *B32B 27/08* (2013.01); *B32B 27/365* (2013.01); *B63B 5/24* (2013.01); *B63B 35/79* (2013.01); *B29K 2655/02* (2013.01); *B29K 2669/00* (2013.01); *B29L 2031/5272* (2013.01); *B32B 2355/02* (2013.01); *B32B 2605/00* (2013.01)

(58) Field of Classification Search
CPC . B63B 35/79; B63B 35/7903; B63B 35/7906; B63B 35/7909; B63B 5/24; B63B 2005/242; B63B 2005/245; B63B 2005/247
USPC .............................................. 114/65, 74, 357
See application file for complete search history.

(56) References Cited

U.S. PATENT DOCUMENTS

| | | | | |
|---|---|---|---|---|
| 4,255,221 A | * | 3/1981 | Young ................... | B29C 33/307 156/382 |
| 4,621,002 A | * | 11/1986 | Kuhlmann .......... | B63B 35/7906 428/308.4 |

(Continued)

FOREIGN PATENT DOCUMENTS

DE         3146381 A1  *  6/1983  .........  B29C 44/1228

OTHER PUBLICATIONS

Website screenshot of Diablo Paddlesports; https://web.archive.org/web/20160123150609/http://diablopaddlesports.com/store?cat=boats; Jan. 23, 2016 (prior art for purposes of prosecution).

(Continued)

*Primary Examiner* — Ajay Vasudeva
(74) *Attorney, Agent, or Firm* — Shane M. Delsman; Godfrey & Kahn, S.C.

(57) ABSTRACT

In at least some embodiments, the invention is directed to a watercraft that includes a buoyant core, an upper shell bonded to the core and a lower shell bonded to the core, wherein at least one of the upper shell and the lower shell includes a plurality of bonded shell material layers, and wherein the plurality of shell material layers include a polycarbonate-based material layer and an acrylonitrile butadiene styrene-based material layer.

15 Claims, 11 Drawing Sheets

(51) Int. Cl.
*B29C 63/04* (2006.01)
*B29K 655/02* (2006.01)
*B29K 669/00* (2006.01)
*B29L 31/52* (2006.01)

(56) References Cited

U.S. PATENT DOCUMENTS

| | | | | | |
|---|---|---|---|---|---|
| 4,713,032 | A | * | 12/1987 | Frank | B29C 37/0032 264/250 |
| 5,211,593 | A | * | 5/1993 | Schneider | B32B 27/08 114/357 |
| 5,295,883 | A | * | 3/1994 | Moran | B63B 35/7906 114/357 |
| 5,437,755 | A | * | 8/1995 | Lavorel | A63C 5/003 156/235 |
| 5,851,331 | A | * | 12/1998 | Grenetier | A63C 5/003 156/235 |
| 7,029,349 | B2 | * | 4/2006 | Lin | B63B 35/7909 441/65 |
| 7,303,454 | B2 | * | 12/2007 | Cheung | B63B 35/7909 114/357 |
| 7,393,001 | B2 | * | 7/2008 | Rott | A63C 5/003 280/601 |
| 2013/0078410 | A1 | * | 3/2013 | Vergne | B29C 51/16 428/57 |

OTHER PUBLICATIONS

Website screenshot; http://world.bicsport.corn/sup/board/product/id-92-performer-red-561.html; Mar. 22, 2017 (prior art for purposes of prosecution).

Website screenshot of Yoloboard; https://www.yoloboard.com/sup-boards/ultra-tough/2016-yolo-hammerhead-10-7-seafoam.html; Mar. 22, 2017 (prior art for purposes of prosecution).

* cited by examiner

RECREATIONAL WATERCRAFT AND METHOD OF ASSEMBLY

CROSS-REFERENCE TO RELATED APPLICATION

This application claims priority to U.S. Provisional Patent Application No. 62/452,782 filed on Feb. 31, 2017, the disclosure of which is incorporated herein by reference in its entirety for all purposes.

FIELD OF THE INVENTION

The invention relates generally to the field of watercrafts, and more particularly to recreational watercrafts.

BACKGROUND

Various types of watercrafts are commonly used to traverse water. Some such watercrafts include recreational watercrafts, such as paddleboards, surfboards, canoes, kayaks, wake boards, sailboats, etc. Recreational watercrafts are often comprised of a foam base that is covered with epoxy resin and fiberglass, sanded smooth and painted. A graphic and/or paint can be applied and sealed using a clear coat. Such a configuration typically suffers from a lack of durability and rigidity, among other things.

Additionally, it is often desired to secure ornate or descriptive graphics to enhance the aesthetic appeal of the watercraft. Prior constructions often use adhesive backed graphics, or laminate the graphics to or paint the watercraft, sometimes using an epoxy clear coat. These methods of attachment often result in a lack of durability and aesthetic appeal of the graphic, thereby diminishing the value of the watercraft. For example, graphics applied directly to the surface are more susceptible to being faded by the elements, e.g. the sun, being worn off, e.g. during repeated use, and/or being scratched off, e.g. from being in contact with a hard object.

As such, there is a need for a watercraft that can provide a durable and aesthetically appealing recreational watercraft that does not suffer from the disadvantages noted above, as well as various other disadvantages.

It will be understood by those skilled in the art that one or more aspects of the recreational watercraft and method of assembly can meet certain objectives, while one or more other aspects can lead to certain other objectives. Other objects, features, benefits and advantages of the recreational watercraft and method of assembly will be apparent in this summary and descriptions of the disclosed embodiments, and will be readily apparent to those skilled in the art. Such objects, features, benefits and advantages will be apparent from the above as taken in conjunction with the accompanying figures and all reasonable inferences to be drawn therefrom.

BRIEF DESCRIPTION OF THE DRAWINGS

The accompanying drawing figures, which are incorporated in and constitute a part of the description, illustrate several aspects of the recreational watercraft and method of assembly, and together with the description, serve to explain the principles of the recreational watercraft and method of assembly. The following description is based on embodiments of the recreational watercraft and method of assembly and should not be taken as limiting the recreational watercraft and method of assembly with regard to alternative embodiments that are not explicitly described herein. A brief description of the figures is as follows.

Figure 1:
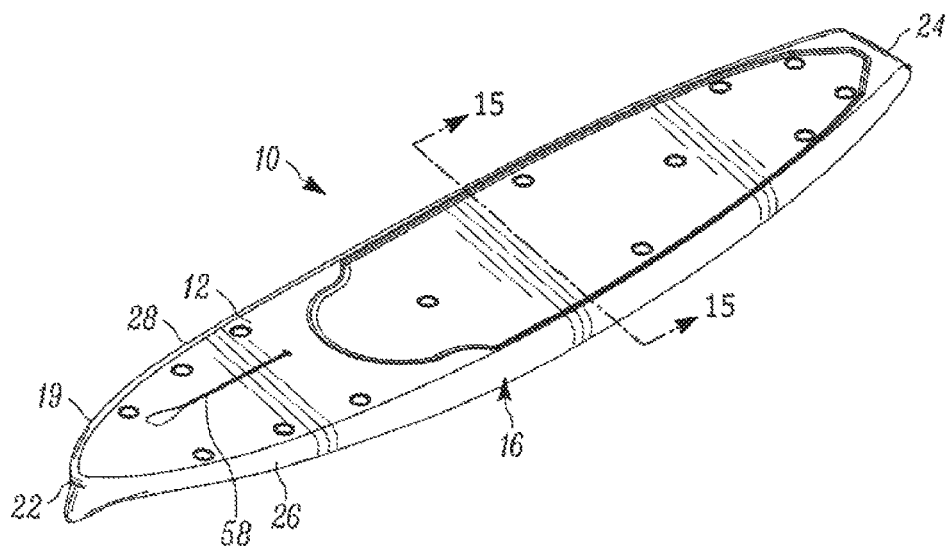
FIG. 1 is a top front perspective view of a recreational watercraft.

In view of the many possible embodiments to which the principles of the present invention may be applied, it should be recognized that the embodiments described herein with respect to the drawing figures are meant to be illustrative only and should not be taken as limiting the scope of the invention.

DETAILED DESCRIPTION

Figure 2:
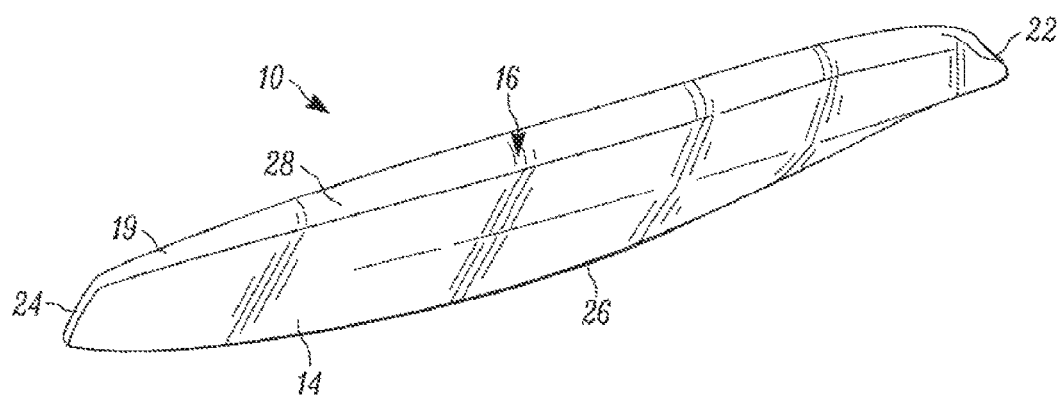
FIG. 2 is a bottom rear perspective view of the watercraft of FIG. 1.

Referring to FIGS. 1 and 2, a recreational watercraft 10 is illustrated in a form that includes a top surface 12 juxtaposed with a bottom surface 14 along a rail 16. The top surface 12 can include various securements and orifices suitable for the securement of gear, nets, ropes, etc., as well as various pads and textures to provide suitable footing for a user of the watercraft 10. The bottom surface 14 (FIG. 2) can be shaped to include one or more contours that can assist with providing stability of the watercraft, as well as assist with the reduction of resistance to movement, thereby allowing a user to operate the watercraft 10 with minimal effort while maintaining an upright position (e.g., standing, sitting, or kneeling on the top surface).

The rail 16 is configured to provide a suitable portion for abutment of the watercraft 10 with other objects and can extend continuously around a perimeter 19 of the watercraft 10 between the top surface 12 and the bottom surface 14, for example, extending along a front 22, a rear 24, a first side 26, and a second side 28 of the water craft, or it can extend along lesser portions thereof.

Figure 3:
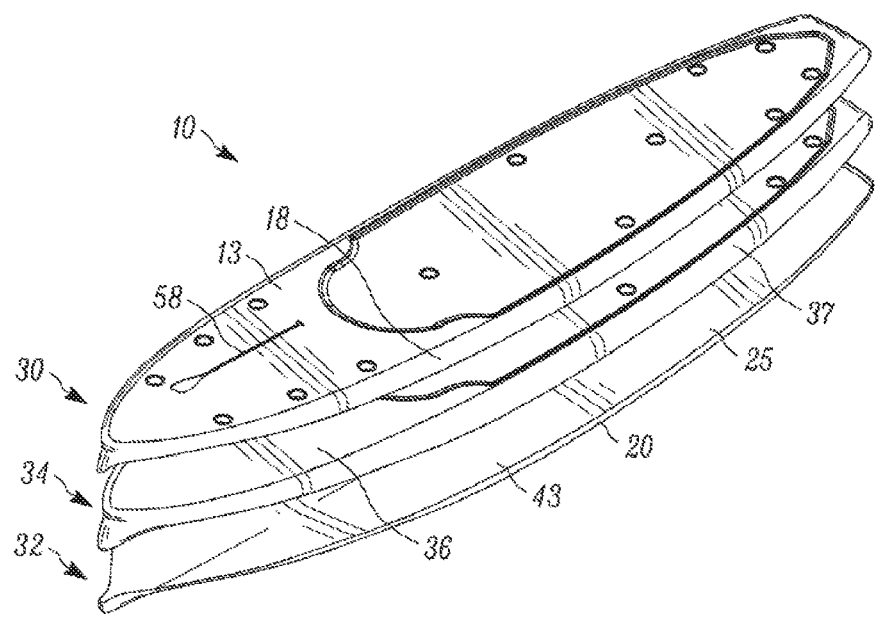
FIG. 3 is an exploded top front perspective view of the watercraft of FIG. 1 prior to assembly.
Figure 4:
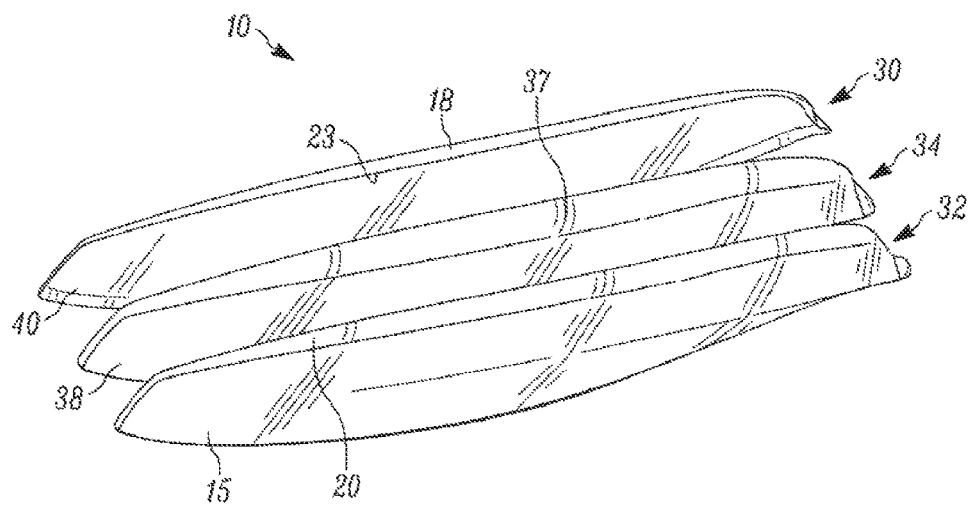
FIG. 4 is an exploded bottom rear perspective view of the watercraft of FIG. 3.

Referring to FIGS. 3 and 4, exploded views of the watercraft in FIG. 1 are provided. As shown, the watercraft 10 is comprised of a plurality of formed components. More particularly, in at least some embodiments, the watercraft 10 includes an upper shell 30 and a lower shell 32, each bonded to a core 34, wherein the shells 30, 32 and the core 34 can include one or more of the elements as described herein forming at least a portion thereof. In at least some embodiments, the upper shell 30 includes a shell top surface 13 and an upper rail portion 18, and the lower shell 32 includes a shell bottom surface 15 and a lower rail portion 20. The upper rail portion 18 further includes an upper rail portion edge 23 and the lower rail portion 20 further includes a lower rail portion edge 25, wherein the upper and lower rail portion edges 23, 25, extend one of partially, substantially, or completely around the perimeter 19 of the watercraft 10.

Figure 5:
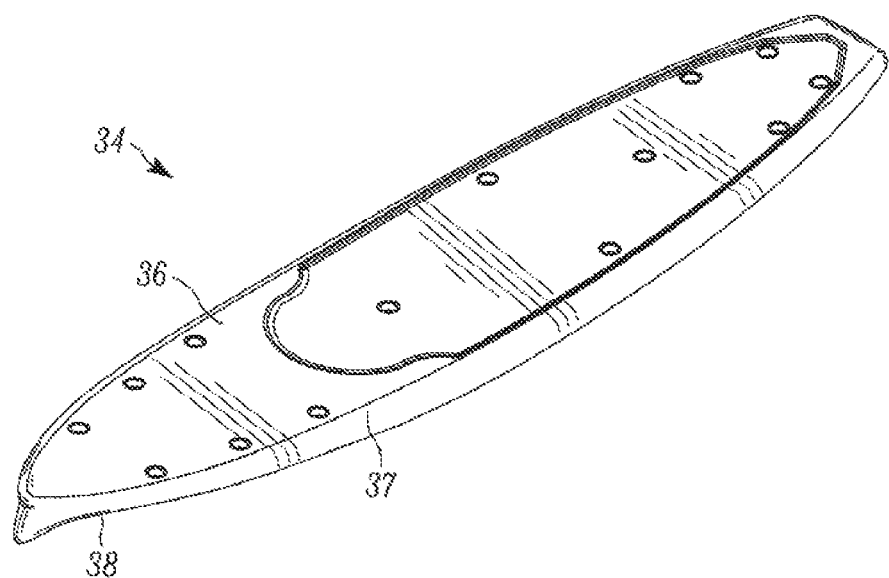
FIG. 5 is a top front perspective view of a core.
Figure 6:
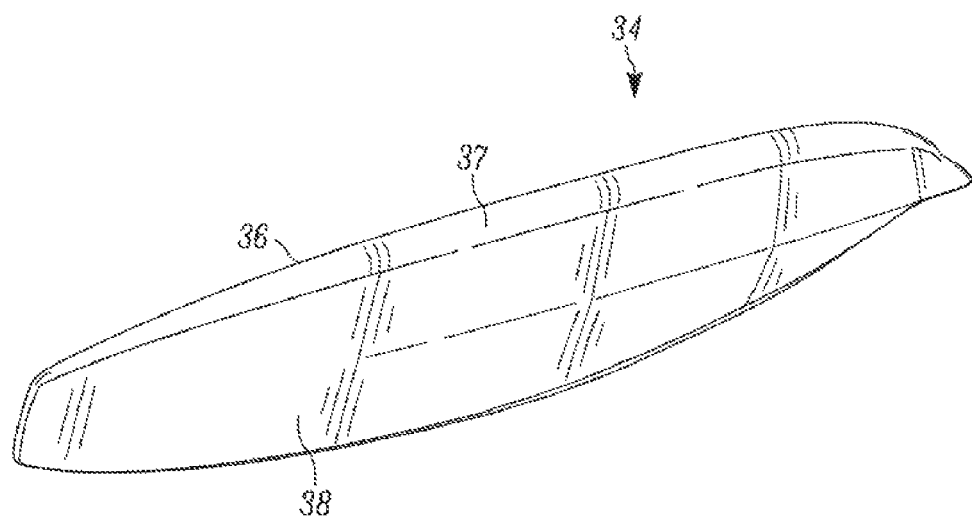
FIG. 6 is a bottom rear perspective view of the core of FIG. 5.

Referring to FIGS. 5 and 6, an embodiment of the core 34 is illustrated. The core 34 includes a core top portion 36 and a core bottom portion 38, with a core rail portion 37 extending therebetween about the perimeter of the core 34. The core 34 can be shaped and sized to accommodate various configurations and desired use characteristics, and constitutes the general form of the watercraft 10. More particularly, the upper shell 30 and lower shell 32 are bonded to the core 34. The core 34 can be comprised of one or more of various materials, such as Expanded Polystyrene insulation (EPS), Styrofoam, Poly Urethane Foam, Extruded Polystyrene (XPS) and/or other materials suitable to provide buoyancy for the watercraft 10. The core 34 can be formed using a mold, then shaped by hand and/or via the use of a CNC machine to achieve the desired shape. In at least one embodiment, the core is made from a one pound density Styrofoam material.

The core 34 can be covered with one or more core outer layers of material, such as fiberglass, polycarbonate, acrylonitrile butadiene styrene (ABS), epoxy, etc., to assist with the desired bonding of subsequent materials thereto, as well as to enhance strength and durability. In at least some embodiments, such core outer layers can include multiple layers of fiberglass, which are sanded smooth between each layer application. In at least one embodiment, the core 34 is formed by shaping a blank made from a buoyant material, for example, EPS, Styrofoam, etc., sealing the blank with a blank sealer, and bonding a layer of textile, such as fiberglass or carbon fiber thereto using an adhesive, for example epoxy resin, then sanding and repeating again. A sealant can be used to prevent the core 34 from absorbing adhesives. The core 34 with fiberglass can also be put into a vacuum, for example a vacuum bag, in order to remove air bubbles trapped between the layers of fiberglass.

Figure 7:
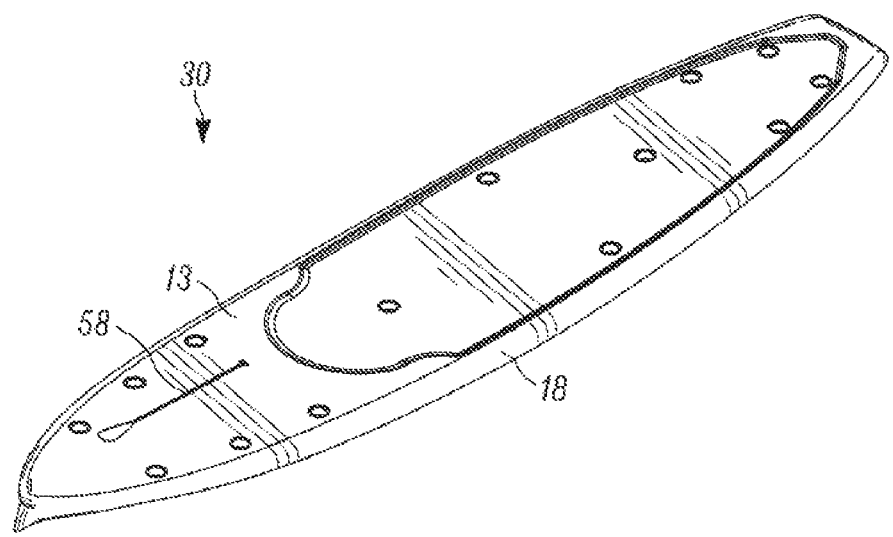
FIG. 7 is a top front perspective view of an upper shell.
Figure 8:
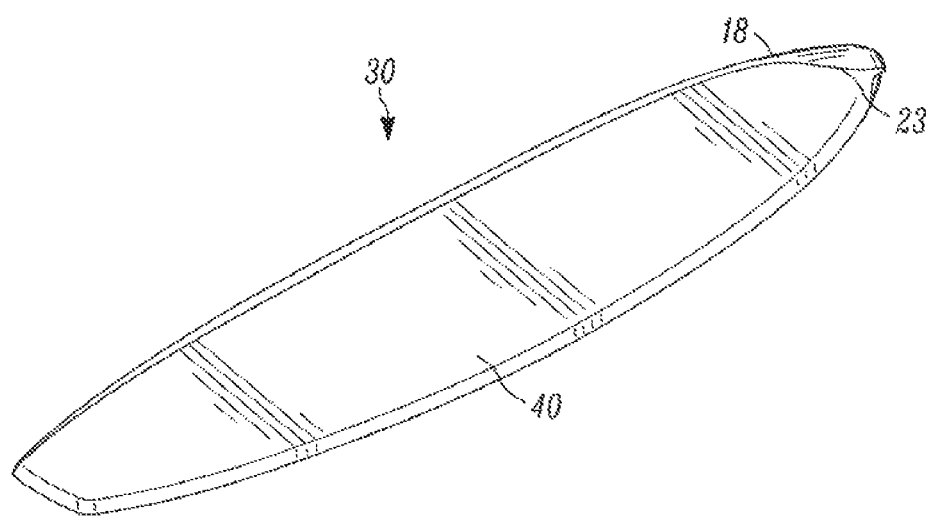
FIG. 8 is a bottom front perspective view of the upper shell of FIG. 7.
Figure 9:
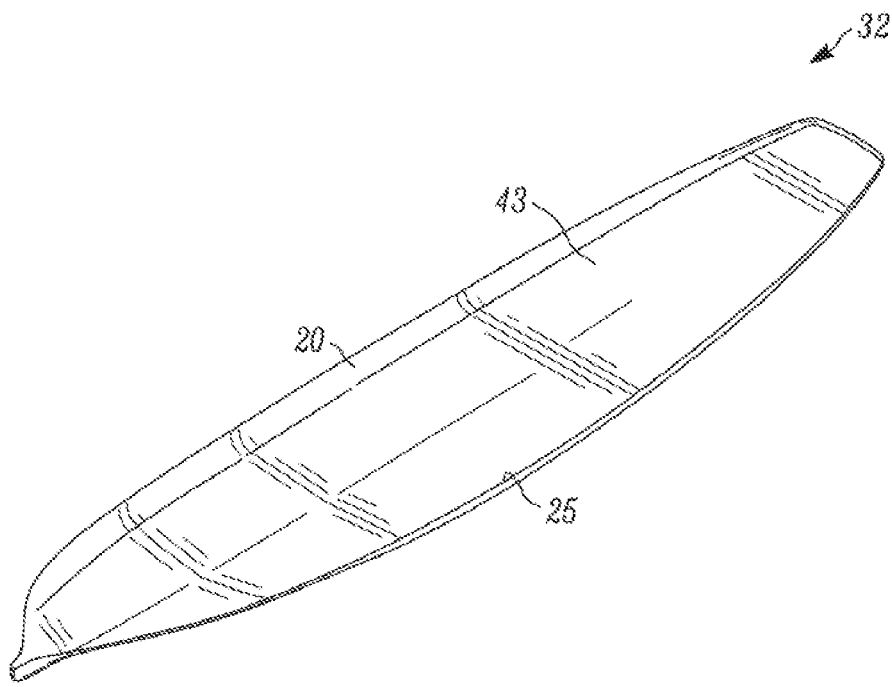
FIG. 9 is a top front perspective view of a lower shell.
Figure 10:
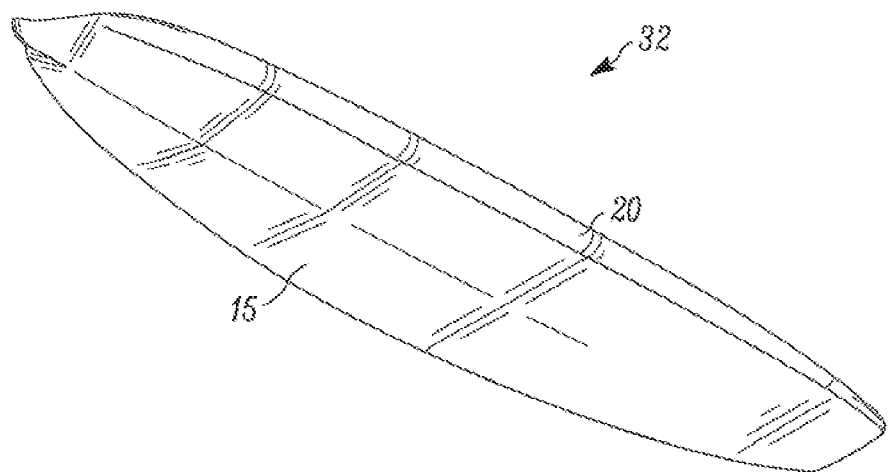
FIG. 10 is a bottom front perspective view of the lower shell of FIG. 9.

FIGS. 7 and 8 provide perspective views of the upper shell 30, including the shell top surface 13, an upper shell mating surface 40, the upper rail portion 18, and a graphic 58. FIGS. 9 and 10 provide perspective views of the lower shell 32 including the shell bottom surface 15, a lower shell mating surface 43, and the lower rail portion 20.

Figure 11:
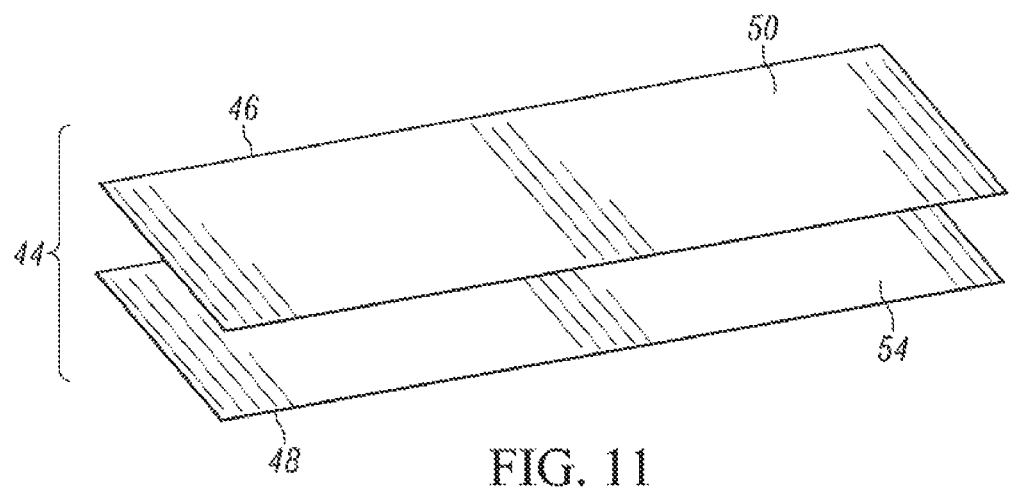
FIG. 11 is a top front perspective view of a first substrate layer and a second substrate layer of a composite substrate.
Figure 12:
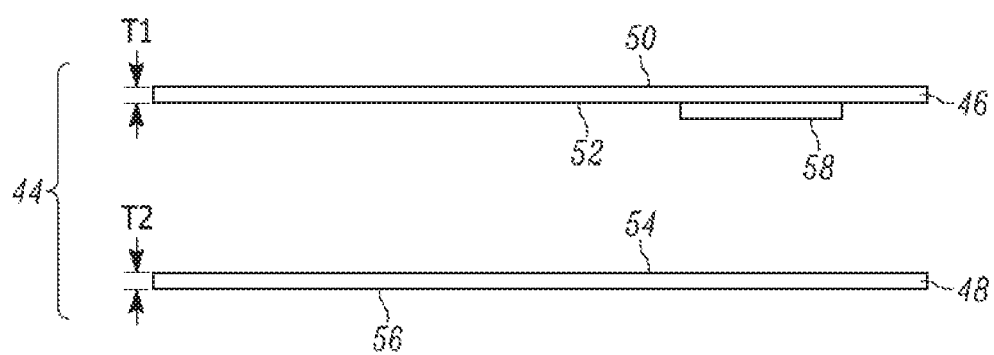
FIG. 12 is a side view of the first substrate layer and the second substrate layer of FIG. 11 in an unbonded configuration.
Figure 13:
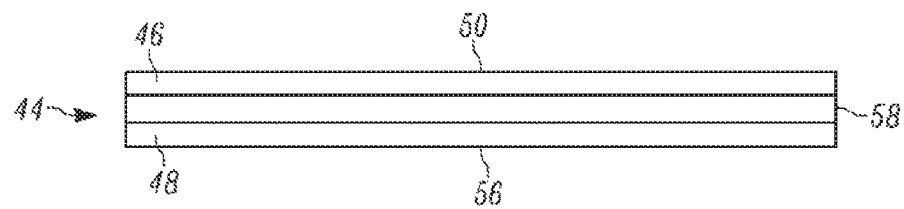
FIG. 13 is a partial side view of the first substrate layer and the second substrate layer of FIG. 11 in a bonded configuration.

Referring now to FIGS. 11 and 12, the upper shell 30 is formed from a composite substrate 44. In at least some embodiments, the composite substrate 44 includes a plurality of shell material layers, for example a first material layer 46 and a second material layer 48. In at least some embodiments, the first material layer 46 is comprised of a polycarbonate-based material, and the second material layer 48 is comprised of an ABS-based material. In at least some embodiments, the first material layer 46 is comprised substantially of a polycarbonate-based material and the second material layer 48 is comprised substantially of an ABS-based material, while in other embodiments, other materials and/or varied percentages can be used for one or both material layers 46, 48, such as polyethylene, multiple layers of a polycarbonate-based material or other substantially clear materials with similar properties.

ABS materials tend to be more elastic, but lighter than polycarbonate materials. Polycarbonate materials are more rigid, but are but less elastic than ABS materials. The use of an ABS and polycarbonate-based composite substrate 44 allows the resulting watercraft to ride higher out of the water because the composite substrate is less dense than the numerous layers of epoxy resin and fiberglass traditionally used on such watercraft. This can also lead to a lighter watercraft, which is desirable for carrying the watercraft to the location of use. Further, epoxy resin can have a fractured look when impacted, thereby reducing the aesthetics of such watercraft. The use of an ABS and polycarbonate-based composite substrate 44 helps make the watercraft more impact resistant. In fact, the ABS and polycarbonate-based composite substrate 44 has a greater impact resistance than the use of an ABS or polycarbonate material alone. The use of an ABS and polycarbonate-based composite substrate 44 also helps give the watercraft a more solid feel when use. For example, when a user is standing on a watercraft, such as a paddleboard, it does not feel like it is compressing or flexing under the feet of the user.

The first material layer 46 includes a first material top surface 50 and a first material bottom surface 52 with a first thickness T1 extending therebetween. The thickness T1 can vary, for example, in at least some embodiments, it is about 0.1 millimeters, while in other embodiments, it can range between 0.001 millimeters to 0.5 millimeters. One or more graphics, such as graphic 58, can be situated on, or in abutment with, the first material bottom surface 52. In at least some embodiments, the graphic 58 is printed on the first material bottom surface 52 using various inks, while in other embodiments, the graphic 58 is a substrate with the graphic pre-printed thereon, such as a fabric substrate. The use of a polycarbonate material as the top or first material layer 46 also provides for protection of any graphics or designs 58 because the polycarbonate material is clear allowing such graphics or designs 58 to be placed under the polycarbonate first material layer 46 or printed on the first material bottom surface 52. The second material layer 48 includes a second material top surface 54 and a second material bottom surface 56 with a second thickness T2 extending therebetween. The first material layer 46 and second material layer 48 can be attached by a number of known means in the art, for example heat laminating.

The thickness T2 can vary, for example, in at least some embodiments, it is between about 1.35 millimeters and about 1.46 millimeters, while in other embodiments, it can range between about 0.5 millimeters and about 2.5 millimeters. In addition, the combined thickness of T1 and T2 is, in at least some embodiments, between about 1.0 millimeter and about 3.175 millimeters. The thickness of the composite substrate 44 can vary depending on the amount of strength desired. Increasing the thickness may also increase the weight of the watercraft. When the watercraft is configured to be portaged, it is desirable to keep the weight of the watercraft within the capabilities of most users. In one embodiment, the weight of a paddleboard could be between thirty five and forty two pounds; however, such paddleboards could be lighter or heavier depending on desired characteristics such as strength, size, etc.

The second material top surface 54 is configured for bonding to the first material bottom surface 52, and the second material bottom surface 56 is configured for bonding to the core 34 about the core top portion 36, understanding that one or more other material layers can be positioned between the second material bottom surface 56 and the core 34, such as an adhesive, epoxy, fiberglass, etc. The composite substrate 44 as described above can be used to form the upper shell 30 and/or the lower shell 32.

Figure 14:
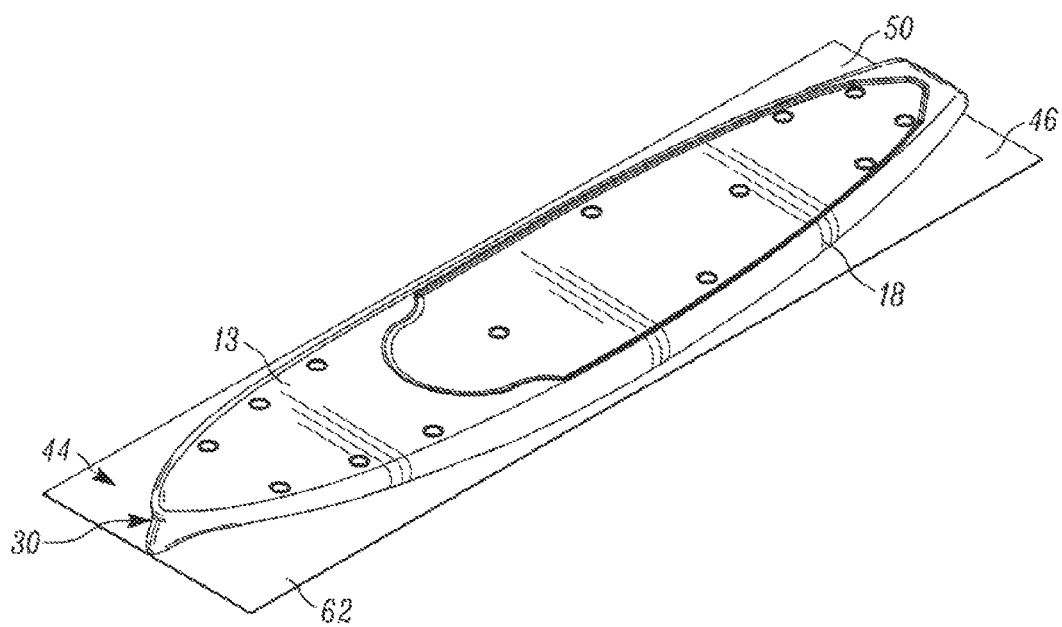
FIG. 14 is a top front perspective view of the composite substrate after molding to form the upper shell.

To form the upper shell 30, the composite substrate 44 is placed over a base mold formed in the desired shape of the upper shell and the mold and heated (thermo-formed) and raised into the composite substrate 44. The mold can also be vacuum ported. Thermo-forming has an additional advantage that the composite substrate gets thinner during thermo-forming. FIG. 14 provides an illustration of the composite substrate 44 after the molding process, where the first material top surface 50 becomes the shell top surface 13. As shown in FIG. 14, the composite substrate 44 now includes the upper shell 30 and an extraneous perimeter portion 62, which is to be cut and removed. In at least some embodiments, the lower shell 32 is formed in the same manner as described above with regard to the upper shell 30, using instead a base mold shaped as desired for the lower shell 32. In at least some embodiments, the upper shell 30 or the lower shell 32 can be formed in a different manner. In at least some embodiments, when trimming the composite substrate 44 to outline the upper shell 30 and lower shell 32, it is necessary to establish a final cut size that provides a gap 45 (as discussed below) between the upper shell 30 and lower shell 32 when bonded to the core 34. Further, in at least some embodiments, the gap 45 must not be less than zero, resulting in an overlap condition, while in other embodiments, the gap 45 can be zero.

Referring again to FIGS. 3 and 4, the upper shell 30 and the lower shell 32 are shown in their completed form. Prior to bonding the upper shell 30 and the lower shell 32 to the core 34, the core 34 can be prepared using one or more various materials. In at least some embodiments, the core 34 is blow-molded and then wrapped in one or more layers of fiberglass and epoxy resin, while in other embodiments, the core 34 is not further treated prior to installation of the upper shell 30 and the lower shell 32. The core 34 could also be sealed, but is not necessary if the core is not wrapped with fiberglass and epoxy resin and, if not, reduces the overall weight of the watercraft 10. To provide enhanced strength to the rail 16, a first augmentation substrate 64, such as a combination of paraphenylenediamine and terephthaloyl chloride (e.g., KEVLAR®) or other suitable strengthening material (e.g., synthetic fiber of high tensile strength), can be bonded to the core rail portion 37 prior to bonding the upper shell 30 and the lower shell 32 to the core 34. Bonding of the first augmentation substrate 64 can be accomplished using one of various methods, including placing it on the core rail portion 37 and applying an adhesive, for example epoxy resin, thereover. The application of a first augmentation substrate 64 helps to strengthen the core rail portion 37 and helps prevent the upper and lower rail portions 18, 20 from being pushed inward, towards the core 34, if the rail 16 contacts a resistant surface during use.

The upper and lower shells 30, 32 can be attached to the core 34 in a number of known means in the art. For example, the lower shell 32 can be placed in a mold and an adhesive, e.g. epoxy resin, is applied to the lower shell mating surface 43. The core 34 is placed into the lower shell 32 and adhesive is applied to the core top portion 36. The upper shell 30 is placed on top of the core 34. A mold is placed on top of the upper shell 30. The entire assembly is then compressed and can also be vacuum ported, e.g. via the molds, to bond the components together.

After bonding of the upper shell 30 and the lower shell 32 to the core 34, the gap 45, if present, extends substantially or completely about the juncture of the upper and lower rail portion edges 23, 25, proximate the core rail portion 37. The height H of the gap 45 can vary as the gap 45 extends around the upper and lower rail portion edges 23, 25. In at least some embodiments, the height H must be at least about 0.5 millimeters, but cannot exceed about 6.4 millimeters, while in other embodiments, the height H cannot exceed about 12 millimeters, while in still other embodiments, the height H can vary between about 3 millimeters and about 6.4 millimeters, while in yet still other embodiments, the height H can vary between about 0 millimeters and about 12 millimeters, while in further other embodiments, the height H can be greater than 6.4 millimeters or lesser than about 3 millimeters.

A gap 45 can be desirable for a number of reasons. First, trimming the extraneous perimeter portion 62 such that the resulting upper and lower rail portion edges 23, 25 perfectly align would be extremely difficult and result in considerable additional time during manufacturing and, thereby, cost. Further, cores 34 may vary depending on whether they are hand shaped or sanded after molding or being created in a CNC machine or even on differences in technique in molding or using the CNC machine. Over trimming the extraneous perimeter portion 62 to ensure a gap 45 exists results in manufacturing efficiency and reduces the opportunity for mistakes. Second, if a vacuum ported mold or bag is used, the gap 45 can allow air to escape the watercraft. Third, having a gap 45 ensures that the proper amount of compression is applied to the upper shell 30, core 34 and lower shell 32 because the upper and lower rail portion edges 23, 25 will not contact each other preventing such compression.

Figure 15:
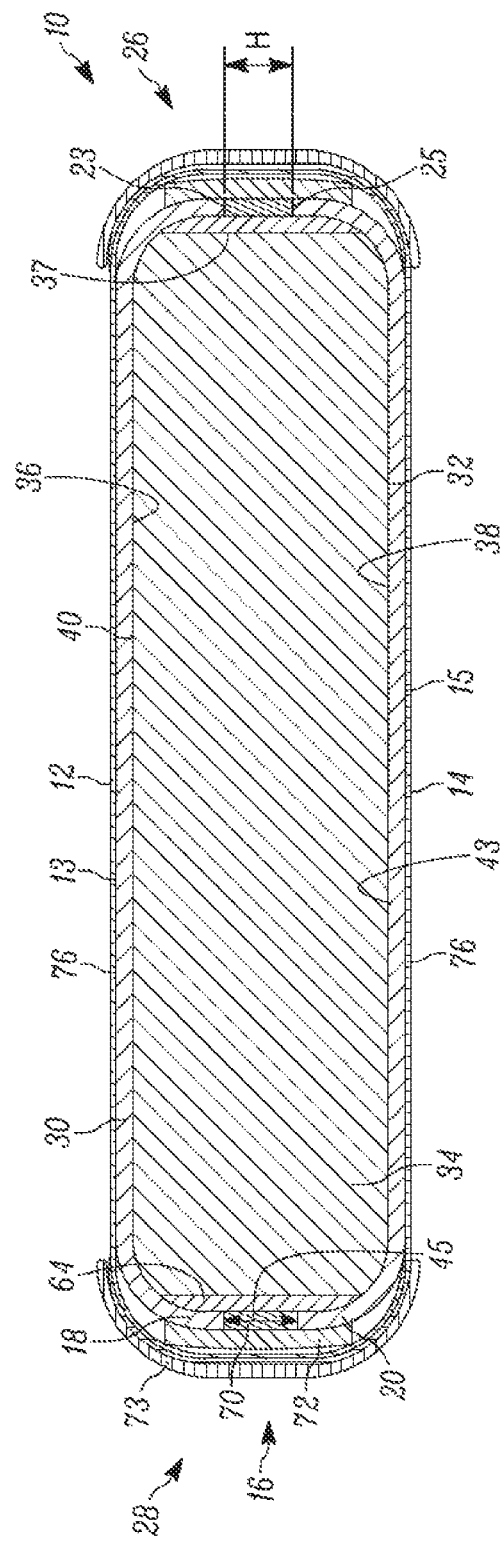
FIG. 15 is a cross-sectional view of the watercraft taken along lines 15-15 of FIG. 1.

Referring to FIG. 15, a cross-sectional view of the watercraft 10 in assembled form is provided. Materials, components and/or elements may not be shown to scale and are for illustrative purposes only. As shown, the first augmentation substrate 64 is bonded between the core rail portion 37 and both the upper and lower rail portions 18, 20, and can be exposed along the gap 45. With or without the addition of the first augmentation substrate 64, the gap 45 is filled with a joint material 70 and sanded or otherwise finished to form a flush or substantially flush surface that extends continuously or substantially continuously between the upper and lower rail portions 18, 20. The joint material 70 can include one or more of various suitable materials, such as expanding polyurethane foam, epoxy putty, silicone, extrusion, tape, polyester putty, Room Temperature Vulcanization silicone (RTV), etc.

In at least some embodiments, a second augmentation substrate 72, which can be comprised of the same material as the first augmentation substrate 64, or another material, such as fiberglass, nylon, polycarbonate, or other sandable material to create a smooth rail 16, is provided over the gap 45 and the upper and lower rail portions 18, 20. In one embodiment, the use of the second augmentation substrate 72, is only possible because the epoxy used to adhere the second augmentation substrate 72 will bond with polycarbonate-based material layers. Any desirable amount of a second augmentation substrate 72 may be used as desired. In one embodiment a six-ounce single layer of KEVLAR® may be used. The second augmentation substrate 72 further enhances the strength of the rail 16, as well as couples the joint material 70 and the upper and lower rail portions 18, 20. In at least some embodiments, the second augmentation substrate 72 can be applied over additional portions of the upper and lower shells 30, 32. Further, in at least some embodiments, only one of the first and second augmentation substrates is utilized.

One or more fiberglass outer layers 76 can be wrapped around the upper and lower shells 30, 32, along with other exposed layers, such as the second augmentation substrate 72, if installed. Applying the fiberglass outer layer 76 provides a workable surface for smoothing and shaping, and can also be overlapped along the rail to provide additional rigidity. Additional material layers can be applied after the fiberglass to further enhance durability and appearance, such as paint 73, lacquer clear coat, colored epoxy resin, etc. If a design element, such as paint 73, is applied, an enamel, epoxy clear coat or other clear protective material can be applied over the design element to protect it. The above described process typically involves applying an outer layer 76 on the top or bottom, one at a time and waiting for each layer to be cured and then sanded before moving to the other of the top or bottom.

Figure 16A:
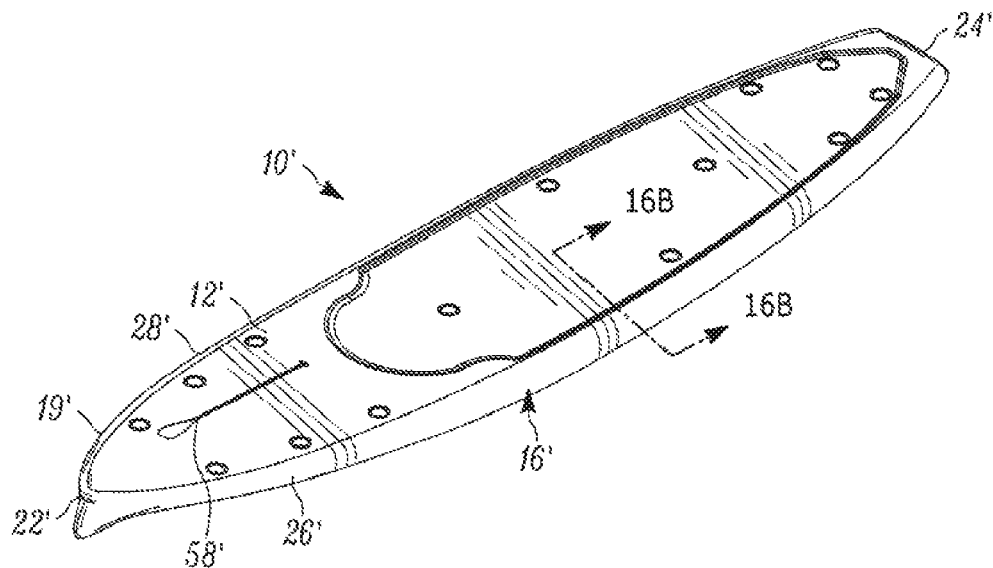
FIG. 16A is a top front perspective view of another embodiment of a recreational watercraft.
Figure 16B:
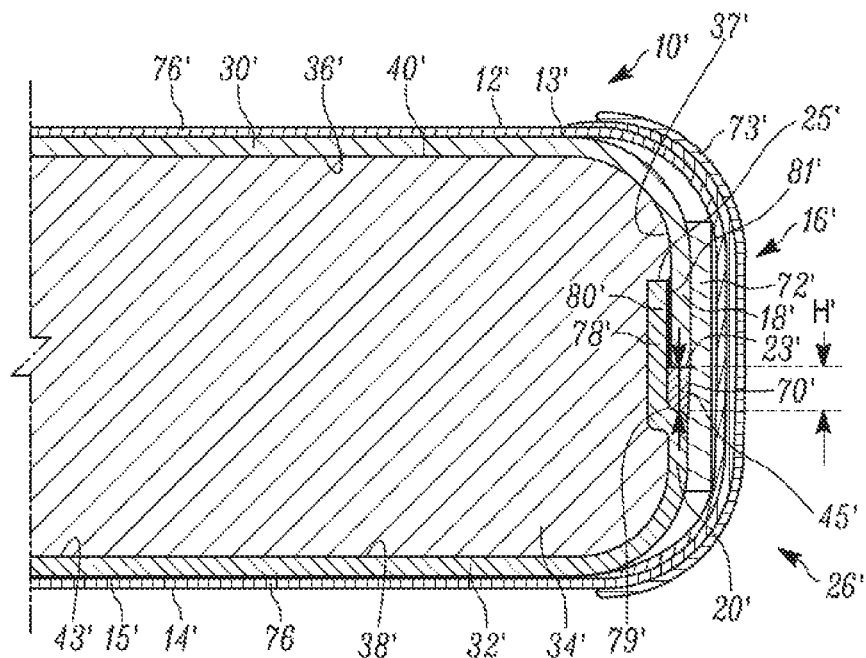
FIG. 16B is a cross-sectional view of the watercraft in FIG. 16A taken along lines 16B-16B.

FIG. 16A provides a view of an alternate configuration of the watercraft 10, namely watercraft 10'. FIG. 16B illustrates a cross-sectional view of the watercraft 10' taken along lines 16-16 of FIG. 16A. As illustrated in the FIGS. 1-16B, various elements of the watercraft 10 and 10' are substantially similar, or the same, in both structure and function, while other elements can provide a similar function, but can include structural modifications. As such, the elements of the watercraft 10' are provided with similar element numbers, but with a prime symbol (') appended thereto, and further, the use and engagement of various components of the watercraft 10, as discussed above, are sufficiently applicable to the corresponding components discussed below for the watercraft 10', absent notation otherwise, such as the bonding of the first material layer 46 and second material layer 48 to form the shells 30, 32. In addition, elements shown in FIGS. 16A and 16B that were not identified in FIGS. 1-15, also include a prime symbol appended thereto for clarity.

As shown in FIG. 16B, in at least some embodiments, an upper shell 30' and a lower shell 32' can form a lap joint along a rail portion 16'. More particularly, an offset end 78' extends from a lower rail edge 79' of the lower rail portion 20', and is positioned behind an upper rail portion 18' to limit deflection of the upper rail portion 18' when the rail portion 16' abuts an object. The offset is sufficient to allow the upper rail portion 18' to be flush with the lower rail portion 20' on either side of a gap 45' between an upper rail portion edge 23' and the lower rail edge 79'. The offset end 78' includes an offset end mating surface 80' that is secured to the upper shell mating surface 40' of the upper rail portion 18', such as by using an adhesive 81'. The gap 45' is similarly filled with a joint material 70' and can be covered with an augmentation substrate, such as a second augmentation substrate 72'. In at least some embodiments, a first augmentation substrate 64' can also be provided adjacent the core 34' and offset end 78', in order to provide additional support, as was discussed above. Lastly, one or more fiberglass outer layers 76' can be wrapped around the upper and lower shells 30', 32', along with other exposed layers, such as the second augmentation substrate 72', if installed, and a finishing layer, such as paint 73', can be provided thereover. The use of a gap 45, 45' allows for increased tolerance when molding and cutting the upper and lower shells 30', 32' and accommodation of wide variances without compromising structural integrity.

Figure 17:
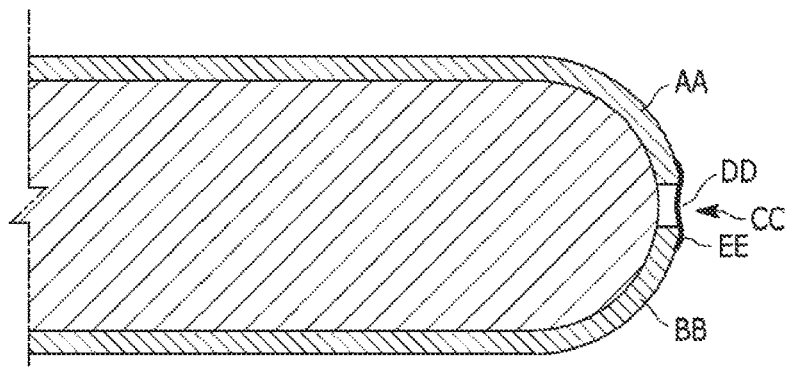
FIG. 17 illustrates a prior art watercraft that includes a tape covered seam.
Figure 18:
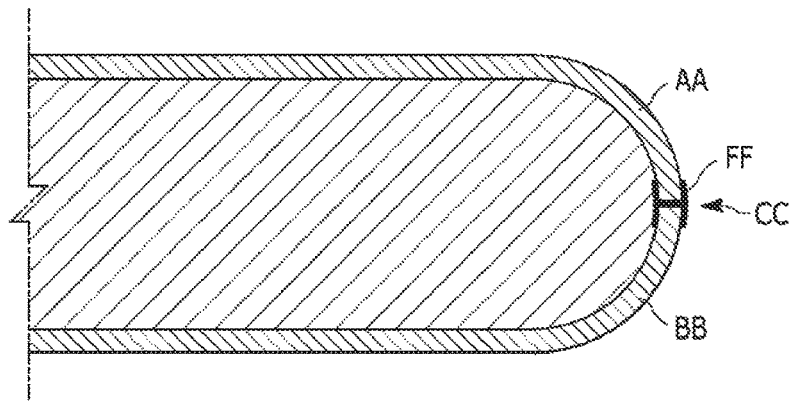
FIG. 18 illustrates a prior art watercraft that includes a clip.
Figure 19:
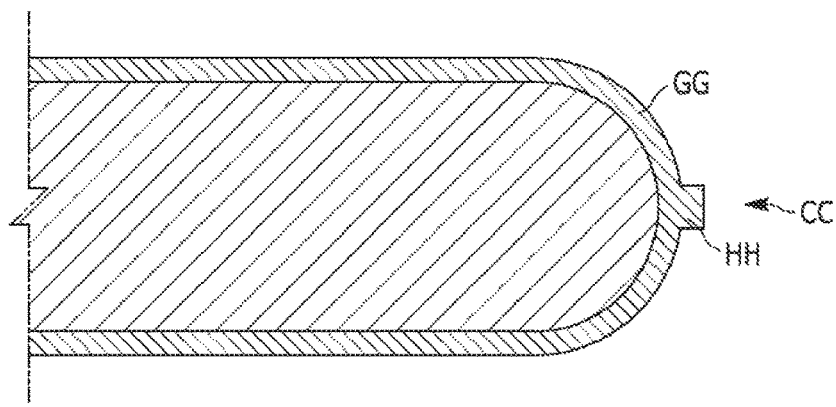
FIG. 19 illustrates a prior art watercraft that includes a protruding ridge.

With reference to FIGS. 17, 18, and 19, which illustrate various prior art watercraft constructions utilizing forming top and bottom shells that are installed over a core, but with sub-standard results and numerous deficiencies. For example, FIG. 17 shows an upper shell AA and lower shell BB made from an ABS material and secured to a core such that a gap DD exists therebetween along a rail portion CC. The lower shell BB is placed in a mold, such as a vacuum ported mold, and the interior surface is treated with an adhesive. A core is placed in the lower shell BB. The exposed top surface of the core or interior surface of the upper shell AA is treated with adhesive and the upper shell placed on the core. A mold, such as a vacuum ported mold, is then placed on top of the upper shell AA. The molds are compressed and a vacuum is applied to the ports to draw out any extra air. The gap DD of the resulting watercraft is covered with tape EE to hide the gap and to prevent water from entering the core.

Such a configuration suffers from a number of disadvantages. First, the tape does not structurally address the weak point along the rail portion, which is vulnerable during use. Therefore, any impact along the rail can puncture the tape EE, penetrate or damage the core and allow water to enter the core. Second, the tape EE can stretch after some use and begin to pucker inwards into the gap DD which is not aesthetically pleasing. Third, the tape EE can begin to peel from repeated exposure to the elements, such as water, sun, etc. or even contact with a hard object, such as a paddle blade. Fourth, forming each shell AA, BB from a sheet of ABS material limits the design options of the watercraft, such as one color for each shell. Any additional graphics have to applied to the exterior of the ABS material.

FIG. 18 shows an upper shell AA and lower shell BB secured to a core. The end of the upper shell AA is epoxied or glued in the top of an "H" clip or extrusion FF and the end of the lower shell BB is epoxied or glued in the bottom the clip FF to attach the shells together along the rail CC and fill in the gap that would otherwise exist therebetween. Such clips FF can be made from a polyvinylchloride material.

Such a configuration suffers from a number of disadvantages. First, the clip FF can add weight to the watercraft and is typically not aesthetically pleasing because the clip FF can be seen. Second, due to the size of the clip FF, there is only a small amount of tolerance or variance in the edges of the shells AA, BB. If the size of the edge varies by greater than the portion of the clip FF that is configured to hold the edge, there will be exposure to the core and water may be able to enter the shells AA, BB. Even if the edge of the shells AA, BB are seated in the clip FF, the rail CC may be susceptible to damage by even slight contact with a hard object if the edge is not within the clip FF sufficient to provide a strong bond. Third, unless the edges of the shells AA, BB are substantially even, when the edges are seated in the clip FF, some portion of the edge will contact the clip while other portions will not. This can prevent proper compression of the two shells AA, BB to the core, which can allow the one or both of the shells to not be in contact with the core and not provide proper support for the user. Fourth, the clip FF extends outward from the watercraft and can affect use characteristics of the watercraft, such as causing additional undesired drag, could cut a user of the watercraft or a bystander that is contacted by the clip or could damage the paddle blade. Fifth, as discussed above, forming each shell AA, BB from an ABS material limits the design options of the watercraft.

Lastly, FIG. 19 shows a shell GG formed such as by twin-sheet thermoforming. Two sheets of ABS are placed in a mold. The ABS is heated and air is injected into the mold to force the ABS against the side of the mold. The edges of the two sheets of ABS enter an indent along the side of the mold and heat fuse together to form an integral block end HH that extends perpendicularly. The shell GG is then placed in another mold and foam is injected into the shell to form the core.

Such a configuration suffers from a number of disadvantages. First, the block end HH leaves a protruding ridge that is undesirable from both an aesthetic and functional point of view. More particularly, the ridge provides a sharp edge on both top and bottom portion of the ridge, which can cut a user of the watercraft, a bystander or even the paddle blade that contacts by the ridge. Second, the block end HH cannot be trimmed off because this is how the two sheets of ABS are connected. Third, this ridge can affect use characteristics of the watercraft, such as causing additional undesired drag. Fourth, such a configuration can be difficult to properly compress because the core is being filled inside the formed shell GG, instead of compressing shells onto a core. Similarly, this configuration can also be hard to remove gaps between the shell GG and core, air pockets and other voids because there is often only one opening in the shell. These difficulties can result in the shell GG to not being in contact with the core and not providing proper support for the user. Fifth, forming the shell GG from an ABS material limits the design options of the watercraft.

Figure 20:
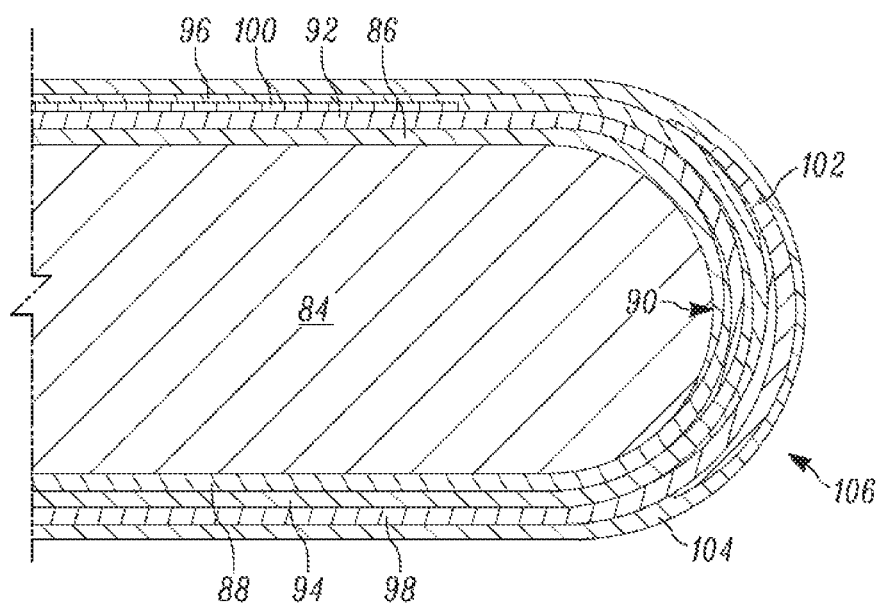
FIG. 20 illustrates a prior art watercraft that includes overlapping layers of fiberglass.

FIG. 20 illustrates another prior art watercraft 82 construction utilizing layers of fiberglass and epoxy wrapped around a core, but with sub-standard results and numerous deficiencies. The core 84 seen in FIG. 20 is formed from a Styrofoam blank and shaped by a computer numerical control machine. The core 84 can then be sealed with sealant to prevent the core from absorbing epoxy from subsequent treatments. A first layer of fiberglass material 84 is then cut generally to the shape of the core 84 and then epoxied to the core. The fiberglass material 86 is then allowed to harden, typically five to eight hours and then sanded down.

The core 84 is then flipped over and a second layer of fiberglass material 88 is cut generally to the shape of the core 84 and then epoxied to the core. The second layer of fiberglass material 88 generally overlaps the first layer of fiberglass material 86 by about six inches on the rail 90 of the core. The second layer of fiberglass material 88 is allowed to harden or cure and then sanded. This process is generally repeated so that six layers of fiberglass material 86, 88, 92, 94, 96, 98 are on the core 84, three layers on each of the top and bottom of the core 84.

This process can also include the use of a vacuum bag after each application of a fiberglass material to draw out any air trapped thereunder. A visual element or graphic 100 can be add to the watercraft 82 before the last layer of fiberglass is added, e.g. the sixth layer 98. The graphic 100 is often a fabric material that is placed on the exposed layer of fiberglass material, e.g. the fourth layer 94. When the sixth layer of fiberglass material is placed over the fabric graphic and epoxied, the epoxy will also penetrate the fabric graphic 100. Paint 102 can also be applied to the exterior layer of fiberglass, the fifth and sixth layers 96, 98 and then an epoxy resin coat 104 applied to the watercraft 82 to protect the paint. The epoxy resin coat 104 is then sanded to obtain a smooth exterior surface.

Although the above described configuration results in no seam along the rail 106 of the watercraft 82, it suffers from a number of disadvantages. First, the entire process takes a considerable amount of time and physical labor, which results in a significant increase in cost to manufacture the watercraft 82. Second, the large number of steps in the process presents numerous opportunities for error or even simply failure of a single component resulting in an unusable or unappealing watercraft 82. Third, the large amount of human involvement results in a large amount of variability in the resulting watercraft 82. For example, the amount of sealer applied to the core 84 and the amount of epoxy applied during each layer of fiberglass material can vary depending on which person did the application. This can result in added expense, if a person uses more material than necessary, and inconsistency in the functionality of the watercraft, heavier watercrafts ride lower in the water resulting in increased drag. Fourth, the resulting watercraft 82 is very susceptible to damage from improper use. For example, dropping the watercraft 82 can result in a fractured look due to the epoxy's material characteristics.

Although the invention has been herein described in what is perceived to be the most practical and preferred embodiments, it is to be understood that the invention is not intended to be limited to the specific embodiments set forth above. Rather, it is recognized that modifications may be made by one of skill in the art of the invention without departing from the spirit or intent of the invention and, therefore, the invention is to be taken as including all reasonable equivalents to the subject matter of the appended claims and the description of the invention herein. Further, it is to be understood that in at least some embodiments, plurality can include one or more of an element. The term "bonded" as used herein can include one or more of various methods for securing elements, such as the use of adhesives, heat, positional limitations, resins, pressure, etc.

What is claimed is:

1. A watercraft comprising:
    a buoyant core having a core top, a core bottom, and a core rail portion;
    an upper shell having an upper rail portion edge, the upper shell bonded to the core top;
    a lower shell having a lower rail portion edge, the lower shell bonded to the core bottom, wherein the upper rail portion edge is substantially aligned with and spaced apart from the lower rail portion edge; and
    a joint material interposed between the upper rail portion edge and lower rail portion edge;
    wherein the upper rail portion edge does not overlap and is not bonded to the lower rail portion edge;
    wherein at least one of the upper shell and the lower shell includes a plurality of bonded shell material layers; and
    wherein the plurality of shell material layers include a polycarbonate-based material layer and an acrylonitrile butadiene styrene-based material layer.

2. The watercraft of claim 1, wherein the acrylonitrile butadiene styrene-based material layer is situated between the polycarbonate-based material layer and the core.

3. The watercraft of claim 2, wherein a graphic is bonded between the polycarbonate-based material layer and the acrylonitrile butadiene styrene-based material layer.

4. The watercraft of claim 1, wherein the upper shell includes a shell top surface integrally formed with an upper rail portion that includes the upper rail portion edge, and the lower shell includes a shell bottom surface integrally formed with a lower rail portion that includes the lower rail portion edge.

5. The watercraft of claim 4, wherein the upper shell and lower shell are bonded to the core to provide a spaced relation between the upper rail portion edge and the lower rail portion edge as they extend proximate the core rail portion.

6. The watercraft of claim 5, wherein the joint material is bonded between the upper rail portion edge and the lower rail portion edge to provide a flush relation between the upper and lower rail portions and the joint material.

7. The watercraft of claim 6, wherein a first augmentation substrate is positioned between the core rail portion and the upper rail portion and lower rail portion.

8. The watercraft of claim 6, wherein a first augmentation substrate is positioned over, and in contact with, the joint material and the upper and lower rail portions, and not in contact with the core rail portion.

9. The watercraft of claim 6, further including:
a first augmentation substrate positioned between the core rail portion and the upper and lower rail portions; and
a second augmentation substrate positioned over the upper and lower rail portions opposite the first augmentation substrate.

10. A watercraft comprising:
a buoyant core having a core top, a core bottom, and a core rail portion;
an upper shell having an upper rail portion, the upper shell bonded to the core top;
a lower shell having a lower rail portion, the lower shell bonded to the core bottom, wherein at least one of the upper shell and the lower shell includes a plurality of bonded shell material layers;
a joint material between an edge of the upper rail portion and an edge of the lower rail portion, wherein the edges of the upper rail portion and the lower rail portion are substantially vertically aligned; and
a first augmentation substrate positioned over, and in contact with, the joint material and the upper rail portion and lower rail portion, and not in contact with the core rail portion;
wherein the plurality of shell material layers include a polycarbonate-based material layer and an acrylonitrile butadiene styrene-based material layer.

11. The watercraft of claim 10, wherein the acrylonitrile butadiene styrene-based material layer is situated between the polycarbonate-based material layer and the core.

12. The watercraft of claim 11, wherein a graphic is bonded between the polycarbonate-based material layer and the acrylonitrile butadiene styrene-based material layer.

13. The watercraft of claim 10, wherein the upper shell includes a shell top surface integrally formed with the upper rail portion that includes the edge of the upper rail portion, and the lower shell includes a shell bottom surface integrally formed with the lower rail portion that includes the edge of the lower rail portion.

14. The watercraft of claim 13, wherein the upper shell and lower shell are bonded to the core to provide a spaced relation between the upper rail portion edge and the lower rail portion edge as they extend proximate the core rail portion.

15. The watercraft of claim 14, wherein the joint material is bonded between the upper rail portion edge and the lower rail portion edge to provide a flush relation between the upper and lower rail portions and the joint material.

* * * * *